UNITED STATES PATENT OFFICE.

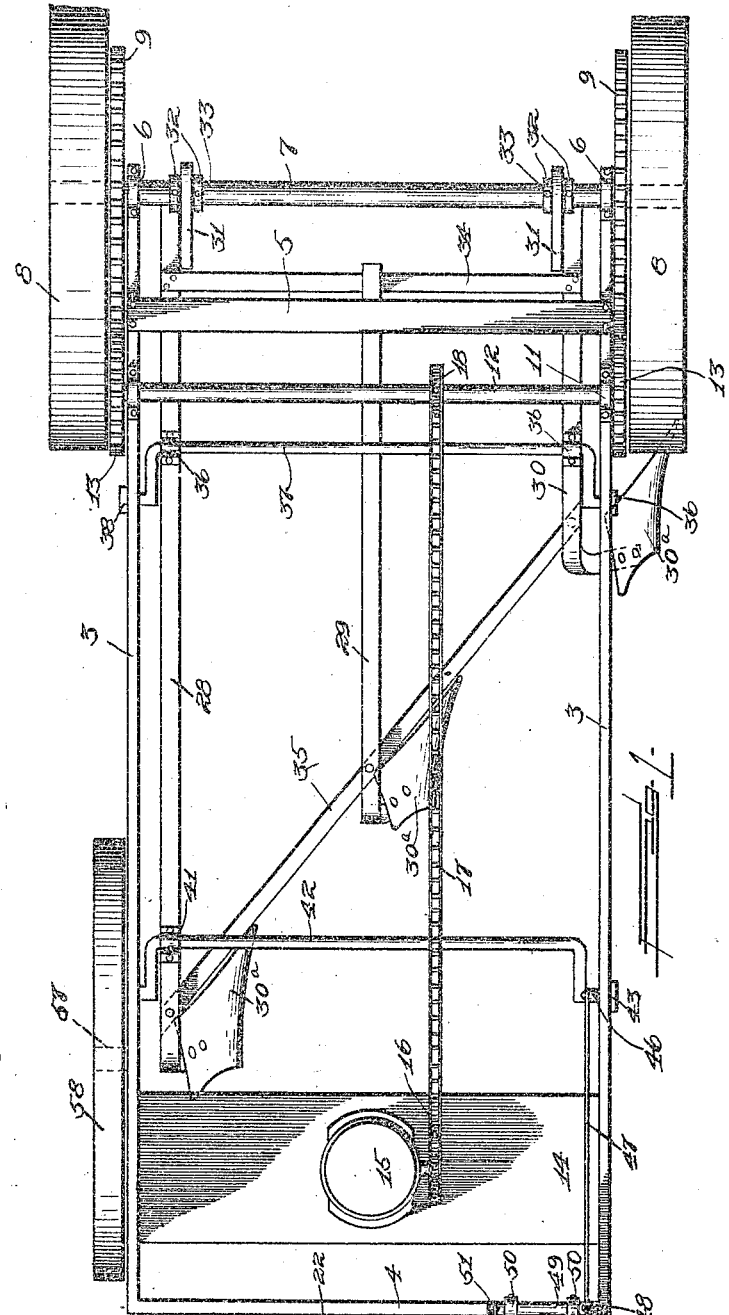

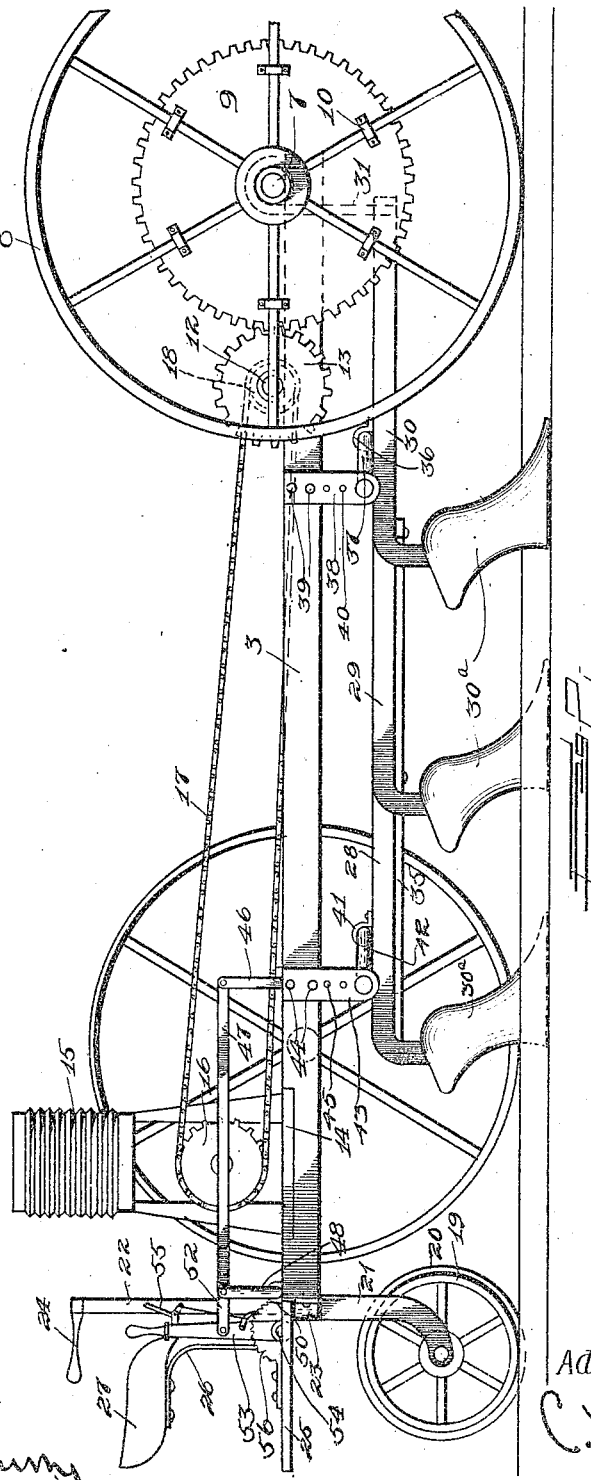

ADOLPH SCHMIDT, OF HASTINGS, NEBRASKA.

PLOW.

1,080,076.  Specification of Letters Patent.  Patented Dec. 2, 1913.

Application filed April 1, 1913.  Serial No. 758,179.

*To all whom it may concern:*

Be it known that I, ADOLPH SCHMIDT, a citizen of the United States, residing at Hastings, in the county of Adams and State of Nebraska, have invented certain new and useful Improvements in Plows, of which the following is a specification.

My invention relates to plows and has particular reference to apparatus of this character which is driven by means of an engine or other prime mover.

An important object of this invention is to provide apparatus of the above mentioned character, which is easy to operate, and is provided with novel means of raising and lowering the plow beams whereby the plow shares carried thereby will be moved into and out of engagement with the soil.

A further object of this invention is to provide apparatus of the above mentioned character, which is simple in construction, easy to operate, durable and comparatively cheap to manufacture.

Other objects and advantages of this invention will be apparent during the course of the following description.

In the drawings, forming a part of this specification and in which like numerals are employed to designate like parts throughout the same, Figure 1 is a plan view of the apparatus, and, Fig. 2 is a side view of the same.

In the drawings, wherein for the purpose of illustration, I have shown a preferred embodiment of my invention, the numeral 3 designates spaced longitudinal beams of the main frame, which are connected at their rear ends by a transverse beam 4 and near and spaced from their forward ends by a transverse beam 5, as shown. Connected with the forward ends of the longitudinal beams 3 are brackets 6, for receiving an axle or spindle 7, upon which are rotatably mounted traction wheels 8. Disposed preferably inwardly of the traction wheels 8 are large gear wheels 9, rigidly connected therewith by means of clamps 10, as shown. If desired, these gear wheels may be cast integral with the traction wheels 8. Disposed rearwardly of the brackets 6 are brackets 11, receiving a transverse shaft 12, upon which are rigidly mounted small gear wheels 13, which engage the large gear wheels 9, as shown. Disposed near the rear transverse beam 4 is a transverse platform 14, rigidly connected with the longitudinal beams 3 by any suitable means. Suitably mounted upon this platform is a prime mover 15, preferably an internal combustion engine of any well known or preferred type. This engine drives a sprocket wheel 16, engaged by a sprocket chain 17, which extends forwardly to engage a sprocket wheel 18, which is rigidly mounted upon the transverse shaft 12.

The rear end of the main frame is supported by a steering wheel 19, provided with an outwardly extending annular flange 20, as shown. This steering wheel is rotatably mounted within a bifurcated standard 21, with which is rigidly connected an upstanding cylindrical steering post 22. This steering post is journaled through a bracket 23, which is rigidly attached to the rear transverse beam 4. Connected with the upper end of the steering post 22 is a crank or handle 24, as shown. The steering post 22 extends through a suitable opening formed in a rearwardly extending platform or support 25, which is rigidly attached to the rear transverse beam 4 by any suitable means. Connected with the platform or support 25 is a suitably stiff spring arm 26, having connection at its upper end with a seat 27.

Disposed below and between the longitudinal beams 3 are transversely spaced plow beams 28, 29 and 30, of different lengths, as shown. These plow beams have plow shares 30ª connected with their rear depending ends, as shown. Connected with the forward end of the plow beams 28 and 30 are hook-shaped brackets 31, which engage upon the axle 7, as shown. The hook portions of the brackets 31 are disposed between spaced rings 32, which are clamped to the axle 7, by means of bolts 33 or the like. The forward ends of the beams 28 and 30 are connected by a transverse strip 34, as shown. This transverse strip is also connected with the forward end of the plow beam 29. The rear ends of the plow beams 28, 29, and 30 are connected by a diagonal rod or brace 35, as shown. It is thus seen that the plow beams 28, 29 and 30 are rigidly connected so that the same may be swung in a vertical plane as an integral structure. Connected with the forward portion of the plow beam 28 and the rear portion of the plow beam 30 are bearings or brackets 36, which receive a forward bail crank-shaft 37. This crankshaft has its ends journaled within vertically adjustable depending brackets or bearings 38, connected with the longitudinal beams 3 by means of bolts 39, adapted to fit within spaced superposed openings 40 formed through the brackets or bearings 38. It is thus seen that the bearings 38 may be permanently vertically adjusted, to raise or lower the crank-shaft 37. Connected with the rear end of the plow beam 29 is a bracket or bearing 41, receiving a rear transverse bail crank-shaft 42, the ends of which are journaled within depending vertically adjustable bearings 43. These bearings are connected with the longitudinal beams 3 by bolts 44, adapted to fit within spaced superposed openings 45, as shown. At one end, the crank-shaft 42 is provided with an upstanding arm or crank 46, having pivotal connection with a reach rod 47, which is pivotally connected with the upper end of a crank 48, carried by a rock-shaft 49. This rock-shaft is journaled through fixed bearings 50 or the like. At its inner end, the rock-shaft 49 is provided with an upstanding crank 51, to which is pivotally connected a link 52, having pivotal connection with an upstanding lever 53. This lever is pivoted, as shown at 54 and is provided with latch means 55, to engage a fixed toothed segment 56, whereby the lever 53 may be securely held in adjustment at different angular positions, against movement in one direction. Connected with the left longitudinal beam 3 is a stub-shaft or axle 57, upon which is rotatably mounted a third-wheel 58 aiding in the support of the rear end of the main frame, without preventing the same being steered by the wheel 19.

The operation of the apparatus is as follows:—The operator who sits within the seat 27 starts the engine 15, which rotates the sprocket wheel 16, such rotation being imparted to the traction wheels 8 for propelling the apparatus. The apparatus is steered by turning the crank or handle 24. By providing the wheel 19 with the annular flange 20 it is more capable of steering the apparatus during the travel thereof. When it is desired to raise the plow shares 30ª out of engagement with the soil, the operator takes hold of the lever 53 and first operates the latch means 55 to release the lever, subsequent to which the same may be swung in proper direction for turning the bail crank-shaft 42, whereby the plow beams will be elevated. When this bail crank shaft 42 is swung upwardly, it raises the rear end of the plow carrying beam 28, the plow carrying beams 29 and 30, moving upwardly with it. The bail crank shaft 37 is swung upwardly by the teeth carrying beams 28, 29 and 30, the same serving to pivotally connect these beams with the longitudinal frame beams 3. It is obvious that the hooks 31 serve to pivotally connect the forward ends of the teeth carrying beams 28 and 30 with the axle 7, to allow the same to swing in a vertical plane and be disconnected from the axle by an upward movement of said hooks 31.

It is to be understood that the form of my invention herewith shown and described, is to be taken as a preferred example of the same, and that certain changes in the shape, size and arrangement of parts may be resorted to without departing from the spirit of the invention or the scope of the subjoined claims.

Having described my invention, I claim:—

1. The combination with a wheeled frame including a transverse member, of a plurality of plow share carrying beams extending longitudinally thereof, an upstanding hook connected with the forward end of each plow share carrying beam and fitting over the transverse member, and a bail crank shaft pivotally connected with the wheeled frame and with certain of the plow share carrying beams.

2. The combination with a wheeled frame including a transverse member, of a plurality of plow share carrying beams extending longitudinally thereof, a plurality of pairs of spaced rings rigidly mounted upon the transverse member, upstanding hooks connected with the forward ends of certain of the plow share carrying beams and passing over the transverse member between the spaced rings, a bail crank shaft pivotally connected with the wheeled frame and with certain of the plow share carrying beams, and means to turn the bail crank shaft.

3. In apparatus of the character described, the combination with a wheeled frame including a forward transverse member, of a plow share carrying beam disposed therebelow and extending longitudinally thereof, an upstanding hook connected with the forward end of the plow share carrying beam and passing over the transverse member, a transverse bail crank shaft pivotally connected with the wheeled frame and with the plow share carrying beam, and means to turn the bail crank shaft and lock the same in adjustment at desired positions.

In testimony whereof I affix my signature in presence of two witnesses.

ADOLPH SCHMIDT.

Witnesses:
CHAS. E. BRUCKMAN,
JNO. SNIDER.